United States Patent [19]
Choudhary et al.

[11] Patent Number: 5,411,927
[45] Date of Patent: May 2, 1995

[54] PROCESS OF PREPARING COMPOSITE CATALYSTS FOR PRODUCTION OF SYNTHESIS GAS BY OXIDATIVE CONVERSION OF METHANE OR NATURAL GAS

[75] Inventors: Vasant R. Choudhary; Vilas H. Rane; Amarjeet M. R. Rajput, all of Maharashtra, India

[73] Assignee: Council of Scientific & Industrial Research, New Delhi, India

[21] Appl. No.: 930,007

[22] Filed: Aug. 14, 1992

[51] Int. Cl.$^6$ .................. B01J 37/14; B01J 23/78; B01J 23/10; B01J 23/58
[52] U.S. Cl. .................. 502/302; 502/303; 502/304
[58] Field of Search ............... 502/207, 213, 302, 303, 502/304; 518/703

[56] References Cited

U.S. PATENT DOCUMENTS

| | | | |
|---|---|---|---|
| 3,929,670 | 12/1975 | Kudo et al. | 502/303 X |
| 4,025,606 | 5/1977 | Acres | 423/245 |
| 4,743,576 | 5/1988 | Schneider et al. | 502/303 X |
| 4,778,826 | 10/1988 | Jezl et al. | 518/703 |
| 5,102,639 | 4/1992 | Chou et al. | 502/302 X |
| 5,130,114 | 7/1992 | Igarashi | 423/245 |

FOREIGN PATENT DOCUMENTS

| | | | |
|---|---|---|---|
| 56-54205 | 5/1981 | Japan | 423/245.3 |
| 63-80849 | 4/1988 | Japan | 423/245.3 |

OTHER PUBLICATIONS

Processes for Air Pollution Control by G. Nonhebel; CRC Press Co., 1964, p. 337.

*Primary Examiner*—Linda Skaling
*Assistant Examiner*—Douglas J. McGinty
*Attorney, Agent, or Firm*—Ladas & Parry

[57] ABSTRACT

An improved process for the production of synthesis gas (or carbon monoxide and hydrogen) by oxidative conversion of natural gas or methane, which comprises passing continuously a gaseous reactant mixture comprising methane (or natural gas) and oxygen (or air) with or without water vapors over reduced or unreduced composite catalyst, containing non-transition and/or transition metal oxides, represented by the formula $T_m.N_n.R.O_p$, wherein T is selected from Ni, CO, Ir or the like or a mixture thereof, m is T/R mole ratio, N is a transition or non-transition element selected from Ti, Zr, Hf, Zn, Mg, Ca or the like or a mixture thereof, n represents the N/R mole ratio, R is a rare earth element selected from La, Ce, Pr, Ho, Yb or the like, or a mixture thereof, O is oxygen and p is the number of oxygen atoms required to fulfill the valence requirement of the elements in the composite catalyst. Synthesis gas can be produced in high yields and with very high production rate by oxidative conversion of methane or natural gas to CO and $H_2$ or synthesis gas, using the composite catalyst containing non-transition and/or transition metal oxides.

5 Claims, No Drawings

PROCESS OF PREPARING COMPOSITE CATALYSTS FOR PRODUCTION OF SYNTHESIS GAS BY OXIDATIVE CONVERSION OF METHANE OR NATURAL GAS

This invention relates to an improved process for the production of synthesis gas (or CO and $H_2$) by oxidative conversion of natural gas (or methane) using composite catalysts containing non-transition and/or transition metal oxides. The process of this invention is useful for the production of synthesis gas, or CO and $H_2$ from natural gas or methane. The process of the present invention could be used by the producers of synthesis gas, or CO and $H_2$ as well as by users of synthesis gas, or CO and $H_2$. For example, for those processes that produce methanol and methanol based products, Fischer-Tropsch synthesis products such as liquid hydrocarbons, olefins, alcohols and aldehydes, oxo-synthesis products, ammonia and ammonia based fertilizers and chemicals, town gas and reduction gas used for the production of sponge iron, etc.

BACKGROUND OF THE INVENTION

The conversion of methane or natural gas to carbon monoxide (CO) and hydrogen ($H_2$) or synthesis gas by catalytic steam reforming, autothermal catalytic reforming and non-catalytic partial oxidation, is known in the prior art.

The catalytic steam reforming of natural gas or methane to synthesis gas, or hydrogen and carbon monoxide is a well established technology practiced for commercial production of hydrogen, carbon monoxide and syngas (i.e. mixture of hydrogen and carbon monoxide). In this process, hydrocarbon feeds are converted to a mixture of $H_2$, CO and $CO_2$ by reacting hydrocarbons with steam over a catalyst (NiO supported on calcium aluminate, alumina, spinel type magnesium aluminum oxide or calcium aluminate titanate) at elevated temperature (850°–1000° C.) and pressure (10–40 atm) and at a steam/carbon mole ratio of 2–5 and gas hourly space velocity (based on wet feed) of about 5000–8000 per hour. This process involves the following reactions:

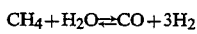

or

and

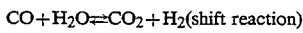

The conversion is highly endothermic and is carried out in a number of parallel tubes packed with catalyst and externally heated by flue gas of temperature of 980°–1040° C. (Kirk and Othmer, Encyclopedea of Chemical Technology, 3rd Edn., 1990 vol. 12 p. 951; Ullamann's Encyclopedea of Industrial Chemistry, 5th Edn., 1989, vol. A-12 p. 186). The main drawbacks of this process are as follows. It is highly endothermic and operated at high temperature. Hence, it is highly energy intensive. Further, the shift reaction occurring in the process leads to formation of $CO_2$ and $H_2$ from CO and water, thus increasing $H_2$/CO ratio. Since a lower $H_2$/CO ratio than that obtained by the steam reforming is required for certain applications of synthesis gas, secondary reformer using $CO_2$ or $O_2$ oxidants are frequently required to reduce the hydrogen content of synthesis gas produced by the steam reforming. Also, the supported nickel catalyst used in the steam reforming is poisoned by sulfur containing compounds present in very low concentrations in the feed hydrocarbons. Further, there is a carbon deposition on the catalyst during the steam reforming.

Autothermal catalytic reforming of methane or natural gas with air or oxygen to $H_2$, CO and $CO_2$ is also an established technology. In this process, a feed gas mixture containing hydrocarbon, steam and oxygen (or air) is passed through a burner and then the combustion gases are passed over a catalyst (nickel supported on alumina) in a fixed bed reactor at 850°–1000° C. and 20–40 atm. (Ullamann's Encyclopedea of Industrial Chemistry 5th Edn., 1989, vol. A-12, p. 202). This process has the following drawbacks. There are large temperature and space velocity variations during start-up and shut down which leads to abrasion and catalyst disintegration, requiring frequent refilling and removal of the catalyst. This process operates at high temperature and pressure and there is a formation of carbon (or carbon deposition) in the reactor.

Non-catalytic partial oxidation of hydrocarbons to $H_2$, CO and $CO_2$ is an established technology used mostly for producing hydrogen from heavy fuel oils, primarily in locations where natural gas or lighter hydrocarbons, including naphtha, were unavailable or were uneconomical as compared with fuel oil or crude oil. This process is carried out by injecting preheated hydrocarbon, oxygen and steam through a specially designed burner into a closed combustion chamber, where partial oxidation of the hydrocarbons with less than stoichiometric oxygen for complete combustion occurs at very high temperature (1350°–1600° C.) and pressures up to 150 atm (Kirk and Othmer, Encyclopedea of Chemical Technology 3rd Edn., 1990 vol. 12 p. 952; Ullamann's Encyclopedea of Industrial Chemistry 5th Edn., 1989, vol. 12, p. 204). The main drawbacks of this process are as follows. This process is operated at a very high temperature and very high pressure and there is extensive soot or carbon formation, particularly from heavy hydrocarbons.

Recently, Ashcroft and co-workers (Nature, vol. 344, 1990, p. 319) have reported selective oxidation of methane to synthesis gas (which is a mildly exothermic reaction) using lanthanide ruthenium oxide ($Ln_2 Ru_2 O_7$ where Ln is lanthanide or rare earth element such as Pr, Sm, Eu, Gd, Tb, Dy, Tm, Yb, Lu) catalysts at 777° C. and total gas hourly space velocity of $4 \times 10^4$ $h^{-1}$ with $CH_4/O_2$ mole ratio of 2.0 and $N_2/CH_4$ mole ratio of 2.0. The catalysts were prepared by conventional solid state reactions between $Ln_2O_3$ and $RuO_2$ in a sealed silica tube. Although, high methane conversions to CO and $H_2$ have been obtained using these catalysts, the catalyst cost is exorbitantly high because of the use of extremely costly Ru in the catalyst in stoichiometric quantities (i.e. Ru/Ln mole ratio=1.0).

In view of the limitations of the prior art processes and catalysts used for the production of synthesis gas or (CO and $H_2$) from natural gas or methane, it was found desirable, during the course of the investigation leading to the present invention, to develop an improved process, which is not energy intensive (or highly endothermic), uses cheaper catalysts and operates at lower temperatures for the conversion of methane or natural gas to CO and $H_2$ or synthesis gas.

SUMMARY OF THE INVENTION

The main object of the present invention is to provide an improved process for the production of synthesis gas or CO and $H_2$ by oxidative conversion of natural gas or methane in the presence of free-oxygen using highly active/selective composite catalysts useful for oxidative conversion of natural gas or methane to synthesis gas or CO and $H_2$ in high yields. The catalysts contain non-transition and/or transition metal oxides, represented by the formula: $T_m.N_n.R.O_p$ wherein T is a transition element selected from Ni, Co, Pd, Ru, Rh, Ir, Pt, Os, and Fe or the like or a mixture of two or more thereof; m the T/R mole ratio is from about 0.01 to 100, N is a transition or non-transition element selected from Ti, Zr, Hf, Y, Th, U, Zn, Cd, B, Al, Tl, Si, Sn, Pb, P, Sb, Bi, Mg, Ca, Sr, Ba, Ga, V, and Sc or the like or a mixture of two or more thereof, n the N/R mole ratio is from 0 to 100, R is a rare earth element selected from La, Ce, Pr, Nd, Pm, Sm, Eu, Gd, Tb, Dy, Ho, Er, Tm, Yb, and Lu or the like or a mixture of two or more thereof, O is oxygen and p is the number of oxygen atoms needed to fulfill the valence requirements of the elements in the composite catalyst. Another important finding of the present invention is that, using the novel composite catalysts the oxidative conversion of natural gas or methane to synthesis gas or CO and $H_2$ in very high yields could be carried out at much lower temperatures and much higher gas hourly space velocities (or much lower contact times) than those used in the prior art. One more finding is that the above mentioned catalysts described in the present invention could be used with or without reduction, for the oxidative conversion of natural gas or methane to synthesis gas; the reduced catalysts could be operated in the process at lower temperatures. Whereas, the unreduced catalysts are first to be operated in the process at higher temperature and then could be used in the process at lower temperatures. The catalyst in its active form is essentially a reduced and/or partially reduced transition metal oxide dispersed in the matrix of other metal oxides.

The main finding of the present invention is that the synthesis gas (or $H_2$ and CO) can be produced in high yields and with a very high production rate by oxidative conversion of natural gas or methane to synthesis gas or $H_2$ and CO, which is a mildly exothermic reaction, using these novel composite catalysts.

DETAILED DESCRIPTION OF THE INVENTION

Accordingly, the present invention provides a process for the production of synthesis gas or CO and $H_2$ by oxidative conversion of natural gas or methane in the presence of free-oxygen using composite catalysts containing non-transition and/or transition metal oxides.

Accordingly, the present invention provides an improved process for production of synthesis gas or CO and $H_2$ by oxidative conversion of natural gas or methane which comprises passing continuously a gaseous reactant mixture comprising methane (or natural gas) and oxygen (or air) with or without water vapor over reduced or unreduced composite catalysts containing non-transition and/or transition metal oxides, represented by the formula: $T_m.N_n.R.O_p$ wherein T is a transition element selected from Ni, Co, Pd, Ru, Rh, Ir, Pt, Os and Fe or the like or a mixture of two or more thereof, m the T/R mole ratio is from 0.01 to 100, N is a transition or non-transition element selected from Ti, Zr, Hf, Y, Th, U, Zn, Cd, B, Al, Tl, Si, Sn, Pb, P, Sb, Bi, Mg, Ca, Sr, Ba, Ga, V and Sc or the like or a mixture of two or more thereof, n the N/R mole ratio is from 0 to 100, R is a rare earth element selected from La, Ce, Pr, Nd, Pm, Sm, Eu, Gd, Tb, Dy, Ho, Er, Tm, Yb and Lu or the like or a mixture of two or more thereof, O is oxygen and p is the number of oxygen atoms required to fulfill the valence requirement of the elements in the composite catalyst, in a fixed bed reactor at specified process conditions to produce gaseous products comprising carbon monoxide, hydrogen, carbon dioxide and water vapors, and separating the water vapors, unconverted reactants and feed components other than the reactants and carbon dioxide from the product stream by known methods.

The process operating conditions for the production of synthesis gas or CO and $H_2$ from natural gas or methane are as follows.

| | |
|---|---|
| Pressure | 0.8–50 atm. |
| Reaction temperature | 200°–1000° C. |
| | (preferably 250°–900° C.) |
| Gas hourly space velocity | $10^3$–$10^8$ cm$^3 \cdot$ g$^{-1} \cdot$ h$^{-1}$ |
| | (preferably $1 \times 10^4$ – $5 \times 10^6$ cm$^3 \cdot$ g$^{-1} \cdot$ h$^{-1}$) |
| Concentration of $CH_4$ in feed | 10–90 mole % |
| | (preferably 20–80 mole %) |
| Concentration of $O_2$ in feed | 1–40 mole % |
| | (preferably 10–36 mole %) |
| $CH_4$ (or natural gas)/$O_2$ mole ratio in feed | 1.6–10 |
| | (preferably 1.8–4) |
| Concentration of $N_2$ or Ar or their mixture in feed | 0–60 mole % |
| Concentration of water in feed | 0–65 mole % |
| $H_2O/CH_4$ (or natural gas) mole ratio in feed | 0–3 (preferably 0–2) |
| Concentration of $CO_2$ in feed | 0–10 mole % |
| Concentration of $C_2H_6$ in feed | 0–10 mole % |
| Concentration of $C_3$ and $C_4$ alkanes in feed | 0–5 mole % |

The catalyst is prepared as follows: (i) mixing thoroughly finely ground one or more transition metal compounds represented by the formula: $T.X_a$ wherein T is a transition element selected from Ni, Co, Pd, Ru, Rh, Ir, Pt, Os and Fe or the like or a mixture of two or more thereof; X is selected from $NO_3$, $CH_3COO$, OH, O, $CO_3$, Cl, and oxalate anions, or the like and a is number of X required to fulfill the valence requirement of the transition element T in the compound; one or more finely ground rare earth metal compounds, represented by the formula: $R.Y_b$, wherein R is a rare earth element selected from La, Ce, Pr, Nd, Pm, Sm, Eu, Gd, Tb, Dy, Ho, Er, Tm, Yb, and Lu or the like or a mixture of two or more thereof, Y is selected from $NO_3$, OH, O, $CO_3$, Cl, $CH_3COO$ and oxalate anions or the like, and b is the number of Y required to fulfill the valence requirement of the rare earth element, and, if required, one or more finely ground non-transition or transition metal compounds represented by a formula: $N.Y_b$, wherein N is selected from non-transition elements such as Mg, Ca, Zn, Cd, B, Al, Tl, Si, Sn, Pb, P, Sb, Bi, Sr, Ba and Ga, or the like or from transition elements such as Ti, Zr, Hf, Y, Th, U, V, and Sc, or the like, which are catalyst precursors; with the T/R and N/R mole ratios of about 0.01 to 100 and 0 to 100, respectively, with or without water, if water is used, the water is just sufficient to make a thick paste, (ii) heating the mixture of catalyst precursors to dryness at a temperature of about 80°–250° C. in air, (iii) decomposing the dried mass containing catalyst precursors to their oxides at a temperature of about 400°–1500° C. in the presence of air or inert gas (viz. $N_2$, He, Ar or the like) or under vacuum for about 0.1–50 h, (iv) powdering the decomposed mass and making by known methods catalyst pellets, extrudes or granules of required size, and (v) calcining the catalyst bodies at a temperature of about 400°–1500° C. in the presence of air, inert gas (viz. $N_2$, He, Ar or like), $CO_2$, or their mixtures, or under vacuum for about 0.1–100 h.

The preferred transition element, T, in the catalyst or in the mixture of catalyst precursors is Ni or Co or a mixture of two or more therof. The preferred rare earth element R in the catalyst or in the mixture of catalyst precursors is Yb, Eu, Sm, Nd, Pr, Dy, or La or a mixture of two or more thereof. The preferred element, N, in the catalyst or in the mixture of catalyst precursors is Al, Mg, or Ca, or a mixture of two or more thereof. The preferred T/R mole ratio m in the catalyst or in the mixture of catalyst precursors is in the range of 0.1–10. The preferred N/R mole ratio n in the catalyst or in the mixture of catalyst precursors is in the range of 0–10. The preferred temperature for the decomposition of the catalyst precursors is in the range of 500°–1000° C. The preferred period of decomposition of catalyst precursors in 0.5–20 h. The preferred temperature for calcination of the catalyst is in the range of 500°–1000° C. The preferred period of calcination of the catalyst is 0.5–20 h. The preferred gas atmosphere for the decomposition of catalyst precursors or the catalyst calcination is air or inert gas.

The product obtained from the process of the invention is a novel composite catalyst containing nontransition and/or transition metal oxides, useful for oxidative conversion of natural gas or methane to synthesis gas or CO and $H_2$.

The present invention reveals that the composite catalysts, containing non-transition and/or transition metal oxides, showing very high methane conversion activity, very high activity/selectivity for CO and $H_2$ or synthesis gas formation, very high productivity for CO and $H_2$ and long catalyst life in the oxidative conversion of methane (or natural gas) to CO and $H_2$ (or synthesis gas), operating at extremely high space velocities and at both lower (below 700° C., even at about 300° C.) and higher (above 700° C.) temperatures, can be prepared by the catalyst preparation process described. Using these catalysts, the oxidative conversion of methane or natural gas to CO and $H_2$ or synthesis gas can be carried out at much lower temperatures. The chemicals used in the catalyst preparation are cheaper.

Using the composite catalyst prepared by this process for oxidative conversion of methane (or natural gas) in presence of free oxygen (i.e. gaseous oxygen), methane can be converted at about 300°–900° C. to CO and $H_2$ (or synthesis gas) at a very high conversion (60–100%) with very high selectivity (80–100%) and productivity (about 5–15 mol. $g^{-1}.h^{-1}$ for CO and about 10–30 mol. $g^{-1}.h^{-1}$ for $H_2$) giving $H_2$/CO mole ratio in the products about 2.0±0.3 without loss of catalytic activity/selectivity for a long period. For example, NiO—$Yb_2O_3$ catalyst (with Ni/Yb mole ratio=1.0) gave 73% conversion of methane with above 86% selectivity for CO and $H_2$ ($H_2$/CO mole ratio=2.0) and productivity of about 10 and 20 mols per gram catalyst per hour for CO and $H_2$, respectively, in the oxidative conversion of methane to synthesis gas at 399° C. and gas hourly space velocity of 515,000 $cm^3.g^{-1}.h^{-1}$.

The catalyst may or may not be reduced before the catalytic reaction. The catalyst reduction may be carried out by passing continuously a gaseous mixture comprising hydrogen and inert gas (i.e., $N_2$, He, or Ar) over the catalyst in the fixed bed reactor at the following conditions.

| | |
|---|---|
| Catalyst reduction pressure | 1–5 atm. |
| Catalyst reduction temperature | 300°–700° C. |
| Concentration of $H_2$ in reducing gas mixture | 1–100 mole % |
| Space velocity of reducing gas mixture | $10^3$–$10^5$ $cm^3 \cdot g^{-1} \cdot h^{-1}$ |
| Catalysts reduction period | 0.5–20 h |

When the catalyst is not reduced by hydrogen before the catalytic reaction, the reduction of the catalyst can be effected by passing the reaction mixture comprising methane (or natural gas) and oxygen (or air) over the catalyst at temperature in the range of 500°–900° C. for a period in the range of 0.1–10 h. Unless the catalyst is reduced this way or by hydrogen as described above, the catalytic oxidative conversion of methane to synthesis gas over the catalyst does not occur at lower temperatures (below 500° C.); the catalyst reaction on the unreduced catalyst occurs above 500° C. The unreduced catalyst is reduced during the catalytic reaction above 500° C. and then the process could be operated at lower temperatures.

In the said process, the products formed are carbon monoxide (CO) and hydrogen ($H_2$) as major products and water and carbon dioxide ($CO_2$) as minor products. The gaseous product stream comprises the above mentioned products, unconverted reactants (i.e. methane or natural gas and oxygen) and components of feed other than reactants.

Because of addition of water in the feed, the $H_2$/CO mole ratio in the product is increased by the shift reaction: $CO + H_2O \rightleftharpoons H_2 + CO_2$, occurring simultaneously with the oxidative conversion of methane (or natural gas) to CO and $H_2$ or synthesis gas.

The present invention reveals that methane or natural gas can be converted to CO and $H_2$ or synthesis gas in high yields with very high productivity at both the lower (at below 700° C. and even at about 300° C.) and the higher (at above 700° C.) temperatures by the said process described above.

In the said process of the invention, at 300°–900° C., the conversion of methane or natural gas, is as high as 60–100% with 80–100% selectivity for CO and $H_2$ and productivity of CO and $H_2$ as high as 10–30 mol. $g^{-1}.h^{-1}$ and 20–60 mol. $g^{-1}.h^{-1}$, respectively, can be achieved.

The main advantages of the invention are
(i) The process of the present invention involves oxidative conversion of natural gas or methane to synthesis gas or co or $H_2$, which is a mildly exothermic reaction, and hence the process is not energy intensive. After start of the catalytic reaction, there is no need to provide energy for the reaction as heat is generated during the reaction.
(ii) Synthesis gas could be produced by the process of the present invention in high yields with very high production rate at much lower temperatures than that used in the processes known in the prior art.
(iii) The process of the present invention uses a novel composite catalyst containing transition elements (preferably Ni, Co or their mixture), which are much cheaper than catalysts containing costly noble metals like ruthenium, in stoichiometric quantities with other elements used in the processes known in the prior art.

(iv) The composite catalysts of the present invention show high activity/selectivity at extremely high space velocities (i.e at very low contact times) and hence have very high productivity for both CO and $H_2$ in the oxidative conversion of methane or natural gas to synthesis gas. There is no carbon deposition on the catalyst in the oxidative conversion of methane (or natural gas) to CO and $H_2$ or synthesis gas. In the process of the present invention, the $H_2$/CO mole ratio in the product gas is about 2.0 and, if required, it can be increased above 2.0 by adding water vapors in the feed.

The present invention is described with respect to the following examples. These are provided for illustrative purpose only and not to be construed as limitations on the invention.

Definition of terms used in the Examples.

Total conversion of methane (%)=Mole % of methane converted to all the products. Conversion of methane to a particular product (%) or yield for a particular product=mole % of methane converted to the particular product.

Selectivity for a particular product (%) =

$$\left[ \frac{\text{Conversion of methane to the product (\%)}}{\text{Total conversion of methane (\%)}} \right] \times 100$$

Productivity (or space-time-yield) for a particular product is the amount of the product formed in the process per unit weight of catalyst per unit time.

Gas hourly space velocity (GHSV) is the volume of gaseous reactant mixture (measured at STP) passed over a unit weight of catalyst per hour.

In the conversion of natural gas, the selectivity and conversion data are based on the carbon balance.

EXAMPLE-1

Preparation of $NiO$—$Yb_2O_3$ catalyst (with Ni/Yb mole ratio=1.0).

Finely ground 7.0 g of $Yb_2O_3$, finely ground 10.34 g of $Ni(NO_3)_2.6H_2O$ and 1.0 ml of deionized water are thoroughly mixed and the resulting thick paste is dried in air oven at 120° C. for 6 h. The dried mass is decomposed at 605° C. in air for 4 h. The decomposed mass is then powdered, pressed binder-free at 4 ton pressure and crushed to 20–30 mesh size particles. The catalyst particles are then calcined in air at 900° C. for 4 h to provide the desired $NiO$—$Yb_2O_3$ catalyst. The surface area of the catalyst was 6.30 $m^2.g^{-1}$.

EXAMPLE-2

Preparation of $NiO$—$CoO$-$Yb_2O_3$ catalyst (Ni:Co:Yb=1:0.5:0.5).

Finely ground 9.74 g of $Co(NO_3)_2.6H_2O$, finely ground 6.60 g of $Yb_2O_3$, finely ground 19.46 g of nickel nitrate hexahydrate and 4 ml of deionized water are thoroughly mixed and the resulting mixture is dried in air oven at 120° C. for 6 h. The dried mass is then decomposed at 610° C. in air for 6 h. The decomposed solid mass is then powdered, pressed binder-free at 4 (or 5) ton pressure and crushed to particles of 22–30 mesh. The catalyst particles are then calcined in air at 930° C. for 6 h to provide the desired $NiO$—$CoO$—$Yb_2O_3$ catalyst. The surface area of the catalyst was 3.26 $m^2.g^{-1}$.

EXAMPLE-3

Preparation of $NiO$—$MgO$—$Sm_2O_3$ catalyst (Ni:Mg:Sm=1:1:0.1).

Finely ground 19.46 g of $Ni(NO_3)_2.6H_2O$, finely ground 6.25 g of magnesium carbonate, finely ground 2.55 g of $(CH_3CO_2)_3$ $Sm.3H_2O$ and 7 ml of deionized water are thoroughly mixed and the resulting mixture is dried in air oven at 120° C. for 4 h. The dried mass is decomposed in air at 630° C. for 4 h. The decomposed mass is then powdered, pressed binder-free at 5 ton pressure and crushed to 22–30 mesh size particles. The catalyst particles are then calcined in air at 930° C. for 5 h to provide the desired $NiO$—$MgO$—$Sm_2O_3$ catalyst. The surface area of the catalyst was 13.4 $m^2.g^{-1}$.

EXAMPLE-4

Preparation of $NiO$—$Al_2O_3$—$Yb_2O_3$ catalyst (Ni:Al:Yb=1:1:1).

Finely ground 5.84 g of $Ni(NO_3)_2.6H_2O$, finely ground 2.05 g of $Al_2O_3$, finely ground 7.91 g of $Yb_2O_3$ in 2 ml of deionized water are thoroughly mixed and the resulting mixture is dried in air oven at 120° C. for 6 h. The dried mass is then decomposed at 600° C. in air for 6 h. The decomposed mass is then powdered, pressed binder-free at 5 ton pressure and crushed to 22–30 mesh size particles. The catalyst particles are then calcined in presence of air at 900° C. for 6 h to provide the desired $NiO$—$Al_2O_3$—$Yb_2O_3$ catalyst. The surface area of the catalyst was 19.08 $m^2.g^{-1}$.

EXAMPLE-5

Process for the oxidative conversion of methane to CO and $H_2$ (or synthesis gas) using the $NiO$—$Yb_2O_3$ (Ni/Yb mole ratio=1.0) catalyst, the preparation of which is described in Example-1.

The oxidative conversion of methane to CO and $H_2$ (i.e. synthesis gas) over the catalyst was carried out in a flow quartz reactor (i.d=5 mm) packed with the catalyst particles (20 mg) using a mixture of pure methane and oxygen as a feed. The reactor temperature was measured by Chromel-Alumel thermocouple located in the catalyst bed. The reactor effluent gases were cooled at about 0° C. to condense the water formed in the reaction using coiled condenser immersed in ice-water slurry and then analyzed for CO, $CO_2$, $H_2$ and unconverted methane and $O_2$ by an on-line gas chromatograph using a Spherocarb column. The change in the volumetric flow rate of gases due to the reaction ($CH_4 + \frac{1}{2}O_2 CO + 2H_2$) was determined by measuring the flow rate of feed and product gases (after removing water) using soap bubble flow-meter. Before carrying out the reaction, the catalyst was pretreated in situ at the calcination temperature of the catalyst in a flow of pure $N_2$ (50.0 ml.min$^{-1}$) for 1 h.

The process performance was evaluated at the following reaction conditions.

| | |
|---|---|
| Feed composition | 67 mol % methane and 33 mol % $O_2$ |
| Gas hourly space velocity (GHSV) | $(5.16 \pm 0.20) \times 10^5$ $cm^3 \cdot g^{-1} \cdot h^{-1}$ |
| Pressure | $1.2 \pm 0.1$ atm. |

The reaction was carried out first at 602° C. for about 1 h and then at the other temperatures.

The results obtained at different reaction temperatures are as follows.

|  | Reaction temperature (°C.) | | | | |
| --- | --- | --- | --- | --- | --- |
|  | 602 | 702 | 803 | 496 | 298 |
| Total $CH_4$ conversion (%) | 80.6 | 84.9 | 89.3 | 74.0 | 71.1 |
| Selectivity for CO (%) | 92.6 | 95.2 | 97.4 | 89.8 | 84.4 |
| Selectivity for $H_2$ (%) | 93.1 | 95.7 | 96.3 | 90.0 | 87.9 |
| Productivity for CO (mol. $g^{-1} h^{-1}$) | 9.3 | 10.8 | 12.0 | 7.6 | 6.6 |
| Productivity for $H_2$ (mol. $g^{-1} h^{-1}$) | 18.7 | 21.4 | 23.7 | 15.2 | 13.9 |
| $H_2$/CO mole ratio in the product | 2.01 | 1.98 | 1.98 | 2.00 | 2.08 |

EXAMPLE-6

Process for the oxidative conversion of methane to CO and $H_2$ (or synthesis gas) over the $NiO-Yb_2O_3$ (Ni/Yb mole ratio=1.0) catalyst, the preparation of which is described in Example-1, reduced by hydrogen before the catalytic reaction.

The reaction over the catalyst was carried out in the reactor and by the procedure similar to that described in Example-5 except that the catalyst pretreated in situ was reduced in the flow (60 $cm^3.min^{-1}$) of a mixture of $H_2$ and $N_2$ (20% $H_2$) at 500° C. for a period of 1 h, before carrying out the catalytic reaction. The reaction was carried out at the following conditions.

Feed composition: 67 mol % $CH_4$ and 33 mol % $O_2$
Gas hourly space velocity: 518,000 $cm^3.g^{-1}.h^{-1}$ (GHSV)
Pressure: 1.2 atm.

The results obtained are given below.

|  | Reaction temperature (°C.) | | | |
| --- | --- | --- | --- | --- |
|  | 500 | 603 | 705 | 399 |
| Total $CH_4$ conversion (%) | 76.7 | 81.3 | 85.1 | 73.0 |
| Selectivity for CO (%) | 88.9 | 93.2 | 94.9 | 86.2 |
| Selectivity for $H_2$ (%) | 88.1 | 89.3 | 91.7 | 86.3 |
| $H_2$/CO mole ratio in the product | 1.98 | 1.92 | 1.93 | 2.00 |

EXAMPLE-7

Process for the oxidative conversion of natural gas to CO and $H_2$ (or synthesis gas) over the reduced $NiO-Yb_2O_3$ (Ni/Yb mole ratio=1.0) catalyst, the preparation of which is described in Example-1.

The reaction over the catalyst was carried out in the reactor and by the procedure similar to that described in Example-6 except that, instead of methane, natural gas comprising of methane, ethane and $C_3$ and $C_4$ alkanes is used in the feed, at the following process conditions.

| Feed composition | 59.6 mol % $CH_4$, 6.0 mol % $C_2H_6$, 1.4 mol % $C_3$ and $C_4$ alkanes, 32 mol % $O_2$, 0.3 mol % $CO_2$ and 0.7 mol % $N_2$ |
| --- | --- |
| GHSV | 515,000 $cm^3 \cdot g^{-1} \cdot h^{-1}$ |
| Pressure | 1.08 atm. |

The results obtained at different temperatures are as follows.

|  | Reaction temperature (°C.) | | |
| --- | --- | --- | --- |
|  | 502 | 651 | 801 |
| Total carbon conversion (%) | 76.3 | 84.9 | 93.6 |
| Selectivity for CO (%) | 90.8 | 93.2 | 98.5 |
| Selectivity for $H_2$ (%) | 85.5 | 92.6 | 97.6 |
| $H_2$/CO mole ratio in products | 1.88 | 1.99 | 1.98 |

EXAMPLE-8

Process for the oxidative conversion of methane to synthesis gas using the $NiO-Yb_2O_3$ catalyst, the preparation of which is described in Example-1, at different gas hourly space velocities.

The catalytic process was carried out in the reactor and by the procedure similar to that described in Example-5 at the following reaction conditions.

| Feed composition | 67 mol % $CH_4$ and 33 mol % $O_2$ |
| --- | --- |
| Pressure | 1.4 ± 0.1 atm. |

The results at different reaction temperatures are as follows.

| GHSV ($cm^3 \cdot g^{-1} \cdot h^{-1}$) | 121,800 | 516,000 | | 10,32,000 | |
| --- | --- | --- | --- | --- | --- |
| Reaction temperature (°C.) | 703 | 702 | 496 | 698 | 501 |
| Total $CH_4$ conversion (%) | 86.5 | 84.9 | 74.0 | 83.9 | 72.7 |
| Selectivity for CO (%) | 92.8 | 95.2 | 89.8 | 96.1 | 91.1 |
| Selectvity for $H_2$ (%) | 94.6 | 95.7 | 90.3 | 93.7 | 90.3 |
| Productivity for CO (mol. $g^{-1} \cdot h^{-1}$) | 2.5 | 10.6 | 7.6 | 20.6 | 14.8 |
| Productivity for $H_2$ (mol. $g^{-1} \cdot h^{-1}$) | 5.2 | 21.3 | 15.2 | 40.9 | 29.3 |
| $H_2$/CO mole ratio in products | 2.04 | 2.01 | 2.01 | 1.95 | 1.98 |

EXAMPLE-9

This example illustrates the process for oxidative conversion of methane to synthesis gas using $NiO-CoO-Yb_2O_3$ catalyst, the preparation of which is described in Example-2, at different process conditions. The reaction over the catalyst was carried out in the reactor and by the procedure similar to that described in Example-5, using a mixture of pure methane and $O_2$ as a feed. The results at different process conditions are presented in Table-1.

TABLE 1

Results on the oxidative conversion of methane to synthesis gas over the $NiO-CoO-Yb_2O_3$ Catalyst, preparation of which is described in Example-2, at different process conditions.

| Temp. (°C.) | $CH_4/O_2$ ratio | GHSV ($cm^3 \cdot g^{-1} \cdot h^{-1}$) | Pressure (atm) | $CH_4$ Conversion (%) | Selectivity for CO(%) | Selectivity for $H_2$(%) | $H_2$/CO mole ratio | Productivity (mol. $g^{-1} \cdot h^{-1}$) | |
| --- | --- | --- | --- | --- | --- | --- | --- | --- | --- |
|  |  |  |  |  |  |  |  | for CO | for $H_2$ |
| 703 | 2.0 | 5,16,000 | 1.115 | 84.7 | 94.2 | 94.0 | 2.00 | 10.5 | 21.0 |
| 803 | 2.0 | 5,16,000 | 1.20 | 90.9 | 95.8 | 95.7 | 2.00 | 12.4 | 24.8 |
| 500 | 4.0 | 5,16,000 | 1.065 | 30.0 | 79.7 | 90.6 | 2.27 | 1.1 | 2.5 |

TABLE 1-continued

Results on the oxidative conversion of methane to synthesis gas over the NiO—CoO—Yb$_2$O$_3$ Catalyst, preparation of which is described in Example-2, at different process conditions.

| Temp. (°C.) | CH$_4$/O$_2$ ratio | GHSV (cm$^3 \cdot$ g$^{-1} \cdot$ h$^{-1}$) | Pressure (atm) | CH$_4$ Conversion (%) | Selectivity for CO(%) | Selectivity for H$_2$(%) | H$_2$/CO mole ratio | Productivity (mol. g$^{-1} \cdot$ h$^{-1}$) for CO | for H$_2$ |
|---|---|---|---|---|---|---|---|---|---|
| 703 | 4.0 | 5,16,000 | 1.070 | 37.0 | 92.0 | 97.2 | 2.11 | 1.9 | 4.1 |
| 500 | 8.0 | 5,16,000 | 1.055 | 14.8 | 68.3 | 90.0 | 2.64 | 0.2 | 0.6 |
| 705 | 8.0 | 5,16,000 | 1.065 | 20.9 | 90.8 | 96.3 | 2.12 | 0.6 | 1.3 |
| 603 | 2.0 | 1,12,500 | 1.045 | 71.1 | 83.3 | 89.1 | 2.14 | 1.4 | 3.0 |
| 702 | 2.0 | 1,12,500 | 1.075 | 80.2 | 90.0 | 92.1 | 2.05 | 1.9 | 4.0 |
| 500 | 2.0 | 1,12,500 | 1.095 | 68.5 | 79.5 | 84.0 | 2.11 | 1.3 | 2.6 |
| 700 | 2.0 | 11,35,200 | 1.255 | 69.6 | 93.9 | 87.7 | 1.87 | 14.8 | 27.8 |
| 505 | 2.0 | 11,35,200 | 1.22 | 65.5 | 90.3 | 86.5 | 1.92 | 13.0 | 24.9 |

EXAMPLE-10

This example illustrates the process for the oxidative conversion of methane to CO and H$_2$ (or synthesis gas) using the NiO—CoO—Yb$_2$O$_3$ catalyst, the preparation of which is given in Example-2, reduced before the reaction at 500° C. and 600° C.

The catalytic process was carried out in the reactor and by the procedure similar to that described in Example-6, at the following process conditions.

| | |
|---|---|
| Feed composition | 66 mol % CH$_4$ and 34 mol % O$_2$ |
| Gas hourly space velocity (GHSV) | 515,000 cm$^3 \cdot$ g$^{-1} \cdot$ h$^{-1}$ |
| Pressure | 1.7 atm. |

The catalyst was reduced before carrying out the reaction at 500° C. and 600° C. by a mixture of H$_2$ and N$_2$ (20% H$_2$) for 1 h.

The results obtained in the process using the catalyst reduced at 500° C. and 600° C. are as follows.

| Reaction temperature (°C.) | Catalyst reduction temperature (°C.) | | | | | | | |
|---|---|---|---|---|---|---|---|---|
| | 500 | | | | 600 | | | |
| | 503 | 703 | 603 | 385 | 401 | 500 | 600 | 702 |
| Total CH$_4$-conversion (%) | 67.5 | 77.3 | 73.0 | 63.8 | 73.9 | 78.5 | 77.6 | 84.8 |
| Selectivity for CO (%) | 90.2 | 95.5 | 92.2 | 86.2 | 88.2 | 91.4 | 91.9 | 95.3 |
| Selectivity for H$_2$ (%) | 90.6 | 93.0 | 92.6 | 88.6 | 88.4 | 90.2 | 90.1 | 93.1 |
| H$_2$/CO mole ratio | 2.01 | 1.95 | 2.01 | 2.06 | 2.00 | 1.97 | 1.96 | 1.95 |

EXAMPLE-11

This example illustrates the process for the oxidative conversion of methane to synthesis gas (CO and H$_2$) using the NiO—CoO—Yb$_2$O$_3$ catalyst, the preparation of which is given in Example-2, at different H$_2$O/CH$_4$ mole ratios in the feed.

The catalytic process was carried out in the reactor and by the procedure similar to that described in Example-5, using a mixture of CH$_4$, O$_2$ and water vapors as a feed at the following reaction conditions.

| | |
|---|---|
| CH$_4$/O$_2$ mole ratio in feed | 2.0 |
| Pressure | 1.1 to 1.2 atm. |
| Gas hourly space velocity (GHSV) | (5.4 ± 0.3) × 10$^5$ cm$^3 \cdot$ g$^{-1} \cdot$ h$^{-1}$ |

The results obtained at different H$_2$O/CH$_4$ mole ratios in feed and reaction temperatures are given below.

| | Reaction temperature, (°C.) | | | | | | | |
|---|---|---|---|---|---|---|---|---|
| H$_2$O/CH$_4$ mole ratio | 704 | 700 | 500 | 500 | 700 | 702 | 500 | 700 |
| | 0.0 | 0.22 | 0.22 | 0.58 | 0.58 | 0.87 | 0.87 | 1.9 |
| Total CH$_4$-conversion (%) | 86.1 | 83.7 | 72.1 | 79.9 | 81.5 | 76.1 | 61.7 | 66.7 |
| Selectivity for CO (%) | 95.0 | 85.8 | 76.6 | 66.0 | 72.0 | 67.1 | 55.9 | 44.5 |
| Selectivity for H$_2$ (%) | 95.2 | 98.2 | 94.6 | 95.0 | 97.2 | 93.6 | 87.5 | 91.0 |
| H$_2$/CO mole ratio | 2.00 | 2.29 | 2.47 | 2.88 | 2.70 | 2.79 | 3.13 | 4.09 |

EXAMPLE-12

This example illustrates the process for the oxidative conversion of methane to synthesis gas (CO and H$_2$) using the reduced NiO—MgO—Sm$_2$O$_3$ (Ni:Mg:Sm=1:1:0.1) catalyst, the preparation of which is given in Example-3, at different reaction temperatures.

The catalytic process was carried out in the reactor and by the procedure similar to that described in Example-6, at the following conditions.

| | |
|---|---|
| Feed composition | 67 mol % CH$_4$ and 33 mol % O$_2$ |
| Pressure | 1.1 atm. |
| Gas hourly space velocity (GHSV) | 518,000 cm$^3 \cdot$ g$^{-1} \cdot$ h$^{-1}$ |

The results obtained at the different reaction temperatures are as follows.

| | Reaction temperature (°C.) | | | |
|---|---|---|---|---|
| | 602 | 507 | 701 | 326 |
| Total CH$_4$ conversion (%) | 76.8 | 69.1 | 81.7 | 61.9 |
| Selectivity for CO (%) | 92.0 | 86.7 | 95.0 | 79.2 |
| Selectivity for H$_2$ | 93.1 | 89.7 | 96.2 | 87.0 |
| H$_2$/CO mole ratio | 2.02 | 2.07 | 2.03 | 2.20 |

EXAMPLE-13

This example illustrates the use or performance of the NiO—Yb$_2$O$_3$ catalyst, the preparation of which is described in Example-1, for the oxidative conversion of methane to synthesis gas.

The oxidative conversion of methane to synthesis gas (i.e. CO and H$_2$ over the catalyst was carried out in a flow quartz reactor (i.d=5 mm) packed with the catalyst particles (20 mg) using a mixture of pure methane and oxygen as a feed. The reactor temperature was measured by Chromel-Alumel thermocouple located in the catalyst bed. The reactor effluent gases were cooled at about 0° C. to condense the water formed in the reaction using coiled condenser immersed in ice-water slurry and then analyzed for CO, $CO_2$, $H_2$ and unconverted methane and $O_2$ by an on-line gas chromatograph using a Spherocarb column. The change in the volumetric flow rate of gases due to the reaction ($CH_4 + \frac{1}{2}O$ $CO + 2H_2$) was determined by measuring the flow rate of feed and product gases (after removing water), using soap bubble flow-meter. Before carrying out the reaction, the catalyst was pretreated in situ at the calcination temperature of the catalyst in a flow of pure $N_2$ (50.0 ml.min$^{-1}$) for 1 h and then reduced in the flow (60 cm$^3$.min$^{-1}$) of a mixture of $H_2$ and $N_2$ (20% $H_2$) at 500° C. for 1 h.

The catalyst performance was evaluated at the following process conditions.

| Feed composition | 67 mol % methane and 33 mol % $O_2$ |
|---|---|
| Space velocity | 515,000 cm$^3 \cdot$ g$^{-1} \cdot$ h$^{-1}$ |
| Pressure | 1.2 atm. |

The results obtained at different reaction temperatures are as follows.

| | Reaction temperature (°C.) | | | |
|---|---|---|---|---|
| | 703 | 603 | 500 | 399 |
| Total $CH_4$ conversion (%) | 85.7 | 81.3 | 76.7 | 73.0 |
| Selectivity for CO (%) | 94.4 | 93.2 | 88.9 | 86.2 |
| Selectivity for $H_2$ (%) | 91.7 | 92.4 | 88.1 | 86.3 |
| Productivity for CO (mol $\cdot$ g$^{-1} \cdot$ h$^{-1}$) | 12.5 | 11.4 | 10.5 | 9.7 |
| Productivity for $H_2$ (mol $\cdot$ g$^{-1} \cdot$ h$^{-1}$) | 24.2 | 22.6 | 20.8 | 19.7 |
| $H_2$/CO mole ratio in the product | 1.94 | 1.98 | 1.98 | 2.00 |

EXAMPLE-14

The use and stability of the NiO—$Yb_2O_3$ catalyst, the preparation of which is described in Example-1, in the oxidative conversion of methane to synthesis gas.

The reaction over the catalyst was carried out in the reactor and by the procedure similar to that described in Example-13, at the following process conditions.

| Feed composition | 67 mol % $CH_4$ and 33 mol % $O_2$ |
|---|---|
| Gas hourly space velocity (GHSV) | 516,000 cm$^3 \cdot$ g$^{-1} \cdot$ h$^{-1}$ |
| Pressure | 1.2 atm. |
| Reaction temperature | 600° ± 3° C. |

The results showing the time-on-stream activity/selectivity of the catalyst in the process are given below.

| | Time-on-stream (h) | | | | | |
|---|---|---|---|---|---|---|
| | 0.5 | 4.0 | 6.0 | 8.0 | 12.0 | 16.0 |
| Total $CH_4$ conversion (%) | 80.6 | 81.3 | 80.7 | 82.5 | 81.1 | 81.9 |
| Selectivity for CO (%) | 93.6 | 93.2 | 93.7 | 93.1 | 94.6 | 94.3 |
| Selectivity for $H_2$ (%) | 92.1 | 92.4 | 92.5 | 91.9 | 92.7 | 92.9 |
| $H_2$/CO mole ratio in products | 1.96 | 1.98 | 1.97 | 1.97 | 1.96 | 1.97 |

EXAMPLE-15

Use of the NiO—$Yb_2O_3$ catalyst, the preparation of which is described in Example-1, without its reduction by $H_2$, in the oxidative conversion of methane to synthesis gas.

The reaction over the catalyst was carried out in the reactor and by the procedure similar to that described in Example-13 except that the catalyst pretreated in situ was not reduced by $H_2$ before carrying out the catalytic reaction. The reaction was carried out at the following conditions.

| Feed composition | 67 mol % $CH_4$ and 33 mol % $O_2$ |
|---|---|
| Gas hourly space velocity (GHSV) | 515,000 cm$^3 \cdot$ g$^{-1} \cdot$ h$^{-1}$ |
| Pressure | 1.35 atm. |

The results obtained at different reaction temperatures are given below.

| | Reaction temperature (°C.) | | | |
|---|---|---|---|---|
| | 700 | 603 | 496 | 298 |
| Total $CH_4$ conversion (%) | 84.9 | 79.1 | 74.0 | 71.1 |
| Selectivity for CO (%) | 95.2 | 93.0 | 89.8 | 84.4 |
| Selectivity for $H_2$ (%) | 95.7 | 91.6 | 90.0 | 87.9 |
| $H_2$/CO mole ratio in product | 2.01 | 1.97 | 2.00 | 2.08 |

EXAMPLE-16

Use of the NiO—CoO—$Yb_2O_3$ catalyst, the preparation of which is described in Example-2, for the oxidative conversion of methane to synthesis gas. The reaction over the catalyst was carried out in the reactor and by the procedure similar to that described in Example-13, at the following reaction conditions.

| Feed composition | 67 mol % $CH_4$ and 33 mol % $O_2$ |
|---|---|
| Gas hourly space velocity (GHSV) | 517,000 cm$^3 \cdot$ g$^{-1} \cdot$ h$^{-1}$ |
| Pressure | 1.09 atm. |

The results obtained at the different reaction temperatures are as follows.

| | Reaction temperature (°C.) | | | |
|---|---|---|---|---|
| | 703 | 603 | 502 | 385 |
| Total $CH_4$ conversion (%) | 77.3 | 73.0 | 65.8 | 63.8 |
| Selectivity for CO (%) | 95.5 | 92.2 | 90.1 | 86.2 |
| Selectivity for $H_2$ (%) | 93.1 | 92.6 | 90.3 | 88.6 |
| $H_2$/CO mole ratio | 1.95 | 2.01 | 2.00 | 2.06 |

EXAMPLE-17

Use of NiO—CoO—$Yb_2O_3$ catalyst (Ni:Co:Yb=1:0.5:0.5), prepared by the procedure similar to that described in Example-2 except the fact that the catalyst calcination temperature was 600° C., in the oxidative conversion of methane to synthesis gas. The surface area of the catalyst was 23.9 m$^2$.g$^{-1}$.

The reaction over the catalyst was carried out in the reactor and by the procedure similar to that described in Example-13, at the following conditions.

| Feed composition | 66 mol % CH$_4$ and 34 mol % O$_2$ |
|---|---|
| Gas hourly space velocity (GHSV) | 515,000 cm$^3$ · g$^{-1}$ · h$^{-1}$ |
| Pressure | 1.35 atm. |

The results obtained at different reaction temperatures are as follows.

|  | Reaction temperature (°C.) | |
|---|---|---|
|  | 605 | 502 |
| Total CH$_4$ conversion (%) | 86.0 | 84.5 |
| Selectivity for CO (%) | 92.4 | 91.7 |
| Selectivity for H2 (%) | 93.5 | 91.9 |
| H$_2$/CO mole ratio | 2.02 | 2.0 |

EXAMPLE-18

Preparation of NiO—Eu$_2$O$_3$ catalyst with Ni/Eu mole ratio of 1.0.

Finely ground 12.0 g of Eu$_2$O$_3$, finely ground 19.8 g of Ni(NO$_3$)$_2$.6H$_2$O and 4 ml of deionized water are thoroughly mixed and resulting mixture is heated in air oven at 100° C. for 4 h and then decomposed at 605° C. in air for 6 h. The decomposed solid mass is then powdered, pressed binder-free at 5 ton pressure and crushed to 22–30 mesh size particles. The catalyst particles are then calcined at 925° C. in presence of air for 4 h to provide the desired NiO—Eu$_2$O$_3$ catalyst. The surface area of the catalyst was 5.60 m$^2$.g$^{-1}$.

EXAMPLE-19

Preparation of NiO—Eu$_2$O$_3$ catalyst with Ni/Eu mole ratio of 0.1.

Finely ground 12.0 g of Eu$_2$O$_3$, finely ground 2.0 g of nickel nitrate hexahydrate and 8 ml of deionized water are thoroughly mixed and the resulting paste is dried in air oven at 120° C. for 6 h. The dried mass is then decomposed at 610° C. in air for 4 h. The decomposed solid mass is then powdered, pressed binder-free at 4 ton pressure and crushed to particles of 22–30 mesh. The catalyst particles are then calcined in air at 910° C. for 10 h to provide the desired NiO—Eu$_2$O$_3$ catalyst. The surface area of the catalyst was 1.80 m$^2$.g$^{-1}$.

EXAMPLE-20

Preparation of NiO—Yb$_2$O$_3$ catalyst with Ni/Yb mole ratio of 4.0.

Finely ground 12.0 g of Yb$_2$O$_3$, finely ground 70.84 g of Ni(NO$_3$)$_2$.6H$_2$O, of and 6 ml of deionized water are thoroughly mixed and the resulting thick paste is dried in air oven at 120° C. for 6 h. The dried mass is decomposed in air at 600° C. for 6 h. The decomposed mass is then powdered, pressed binder-free at 4 ton pressure and crushed to 22–30 mesh size particles. The catalyst particles are then calcined in air at 910° C. for 5 h to provide the desired NiO—Yb$_2$O$_3$ catalyst. The surface area of the catalyst was 5.88 m$^2$.g$^{-1}$.

EXAMPLE-21

Preparation of NiO—Sm$_2$O$_3$ catalyst with Ni/Sm mole ratio of 1.0.

Finely ground 7.62 g of Ni(NO$_3$)$_2$.6H$_2$O, finely ground 10.0 g of (CH$_3$CO$_2$)$_3$ Sm.3H$_2$O and 2 ml of deionized water are thoroughly mixed and the resulting paste is dried in air oven at 130° C. for 12 h. The dried mass is then decomposed in air at 605° C. for 4 h. The decomposed mass is then powdered, pressed binder-free at 5 ton pressure and crushed to 22–30 mesh size particles. The catalyst particles are then calcined in presence of air at 930° C. for 4 h. to provide the desired NiO—Sm$_2$O$_3$ catalyst. The surface area of the catalyst was 2.35 m$^2$.g$^{-1}$.

EXAMPLE-22

Preparation of NiO—Nd$_2$O$_3$ catalyst with Ni/Nd mole ratio of 1.0.

Finely ground 10.0 g of Nd(NO$_3$)$_3$.6H$_2$O, finely ground 6.63 g of Ni(NO$_3$)$_2$.6H$_2$O, and 2 ml of deionized water are thoroughly mixed and the resulting mixture is dried in air oven at 120° C. for 8 h. The dried mass is then decomposed at 610° C. in air for 6 h. The decomposed mass is then powdered, pressed binder-free at 4 ton pressure and crushed to 22–30 mesh size particles. The catalyst particles are then calcined in presence of air at 910° C. for 5 h to provide the desired NiO—Nd$_2$O$_3$ catalyst. The surface area of the catalyst was 2.60 m$^2$.g$^{-1}$.

EXAMPLE-23

Preparation of NiO—La$_2$O$_3$ catalyst with Ni/La mole ratio of 0.5.

Finely ground 10.0 g La$_2$(CO$_3$)$_3$.xH$_2$O, finely ground 6.35 g Ni(NO$_3$)$_2$.6H$_2$O, and 17 ml deionized water are thoroughly mixed and the resulting paste is dried in air oven at 130° C. for 6 h. The dried mass is then decomposed at 710° C. in air for 4 h. The decomposed mass is then powdered, pressed binder-free at 5 ton pressure and crushed to 22–30 mesh size particles. The catalyst particles are then calcined in air at 930° C. for 5 h to provide the desired NiO—La$_2$O$_3$ catalyst. The surface area of the catalyst was 3.80 m$^2$.g$^{-1}$.

EXAMPLE-24

Preparation of CoO—Yb$_2$O$_3$ catalyst with Co/Yb mole ratio of 1.0.

Finely ground 7.0 g of Yb$_2$O$_3$, finely ground 10.34 g of Co(NO$_3$)$_2$.6H$_2$O and 1 ml of deionized water are thoroughly mixed and the resulting mixture is dried in air at 120° C. for 4 h. The dried mass is decomposed in air at 620° C. for 6 h. The decomposed mass is then powdered, pressed binder-free at 4 ton pressure and crushed to 22–30 mesh size particles. The catalyst particles are then calcined in air at 900° C. for 6 h to provide the desired CoO—Yb$_2$O$_3$ catalyst. The surface area of the catalyst was 4.59 m$^2$.g$^{-1}$.

EXAMPLE-25

Preparation of CoO—Eu$_2$O$_3$ catalyst with Co/Eu mole ratio of 1.0.

Finely ground 12.0 g of Eu$_2$O$_3$, finely ground 19.87 g of Co(NO$_3$)$_2$.6H$_2$O and 4 ml of deionized water are thoroughly mixed and the resulting mixture is then dried in air at 130° C. for 5 h. The dried mass is decomposed in air at 600° C. for 4 h. The decomposed mass is then powdered, pressed binder-free at 4 ton pressure and crushed to 22–30 mesh size particles. The catalyst particles are then calcined in air at 910° C. for 4 h to provide the desired CoO—Eu$_2$O$_3$ catalyst. The surface area of the catalyst was 1.87 m$^2$.g$^{-1}$.

EXAMPLE-26

Use of the catalysts, the preparation of which is described in Examples 18-25, for the oxidative conversion of methane to synthesis gas. The reaction over the catalysts was carried out in the reactor and by the procedure similar to that described in Example-13, at the following reaction conditions.

| Feed composition | 67 mol % $CH_4$ and 33 mol % $O_2$ |
|---|---|
| Gas hourly space velocity (GHSV) | 515,000 $cm^3 \cdot g^{-1} \cdot h^{-1}$ |
| Pressure | $1.3 \pm 0.2$ atm. |

The results obtained using the catalysts at different reaction temperatures are presented in Table-2.

EXAMPLE-28

Preparation of $NiO$—$CaO$-$Sm_2O_3$ catalyst (Ni:-Ca:Sm=1:1:0.1).

Finely ground 4.96 g of $Ca(OH)_2$, 2.55 g of $(CH_3CO_2)_3$ $Sm.3H_2O$, 19.46 g of $Ni(NO_3)_2.6H_2O$ and 5 ml of deionized water are thoroughly mixed and the resulting mixture is dried in air at 130° C. for 4 h. The dried mass is decomposed in air at 610° C. for 6 h. The decomposed mass is then powdered, pressed binder-free at 4 ton pressure and crushed to 22-30 mesh size particles. The catalyst particles are then calcined in air 930° C. for 5 h to provide the desired $NiO$—$CaO$—$Sm_2O_3$ catalyst. The surface area of the catalyst was 6.05 $m^2.g^{-1}$.

EXAMPLE-29

TABLE 2

Performance of the catalysts, preparation of which is described in EXAMPLES 18-25, in oxidative conversion of methane to synthesis gas (i.e. CO and $H_2$).

| Catalyst | Example in which catalyst preparation is described | Reaction temperature (°C.) | $CH_4$-conversion (%) | Selectivity for CO (%) | Selectivity for $H_2$ (%) | $H_2/CO$ mole ratio |
|---|---|---|---|---|---|---|
| $NiO$—$Eu_2O_e$ (Ni/Eu = 1.0) | Example-18 | 702 | 84.8 | 93.0 | 89.1 | 1.92 |
|  |  | 600 | 81.8 | 91.4 | 87.5 | 1.91 |
|  |  | 322 | 75.4 | 85.7 | 81.1 | 1.89 |
| $NiO$—$Eu_2O_3$ (Ni/Eu = 0.1) | Example-19 | 703 | 66.1 | 89.1 | 78.8 | 1.77 |
|  |  | 503 | 57.7 | 84.2 | 70.3 | 1.67 |
| $NiO$—$Yb_2O_3$ (Ni/Yb = 4.0) | Example-20 | 704 | 86.6 | 95.5 | 96.1 | 2.01 |
|  |  | 602 | 78.7 | 91.0 | 93.6 | 2.06 |
|  |  | 300 | 70.9 | 83.6 | 87.0 | 2.08 |
| $NiO$—$Sm_2O_3$ (Ni/Sm = 1.0) | Example-21 | 702 | 81.0 | 94.9 | 92.8 | 1.96 |
|  |  | 602 | 70.6 | 91.7 | 90.3 | 1.97 |
|  |  | 326 | 63.3 | 84.9 | 84.1 | 1.98 |
| $NiO$—$Nd_2O_3$ (Ni/Nd = 1.0) | Example-22 | 702 | 77.3 | 94.7 | 93.6 | 1.98 |
|  |  | 603 | 73.3 | 89.5 | 90.2 | 2.02 |
|  |  | 502 | 68.9 | 87.5 | 87.3 | 2.00 |
| $NiO$—$La_2O_3$ (Ni/La = 1.0) | Example-23 | 702 | 69.4 | 90.6 | 86.7 | 1.91 |
|  |  | 601 | 66.2 | 87.3 | 83.3 | 1.91 |
| $CoO$—$Yb_2O_3$ (Co/Yb = 1.0) | Example-24 | 702 | 79.2 | 89.9 | 88.4 | 1.97 |
|  |  | 596 | 72.6 | 87.2 | 86.1 | 1.97 |
| $CoO$—$Eu_2O_3$ (Co/Eu = 1.0) | Example-25 | 704 | 62.0 | 88.1 | 84.9 | 1.91 |

EXAMPLE-27

Preparation of $NiO$—$MgO$—$La_2O_3$ catalyst (Ni:Mg:La=1:1:0.1).

Finely ground 6.25 g of $MgCO_3$, 2.90 g of $La(NO_3)_3.6H_2O$, 19.46 g of $Ni(NO_3)_2.6H_2O$ and 8 ml deionized water are thoroughly mixed and the resulting mixture is dried in air at 120° C. for 6 h. The dried mass is decomposed in air at 600° C. for 6 h. The decomposed mass is then powdered, pressed binder-free at 5 ton pressure and crushed to 22-30 mesh size particles. The catalyst particles are then calcined in air at 900° C. for 6 h to provide the desired $NiO$—$MgO$—$La_2O_3$ catalyst. The surface area of the catalyst was 4.63 $m^2.g^{-1}$.

Use of the catalysts, the preparation of which is described in EXAMPLES 27, 28 and 3, for the oxidative conversion of methane to synthesis gas. The reaction over the catalysts was carried out in the reactor and by the procedure similar to that described in Example-2, at the following reaction conditions.

| Feed composition | 67 mol % $CH_4$ and 3.7 mol % $O_2$ |
|---|---|
| Gas hourly space velocity (GHSV) | 516,000 $cm^3 \cdot g^{-1} \cdot h^{-1}$ |
| Pressure | $1.3 \pm 0.1$ atm. |

The results obtained using the catalysts at different reaction temperatures are presented in Table-3.

TABLE 3

Performance of the catalysts, preparation of which is described in EXAMPLES 27, 28 and 3, in oxidative conversion of methane to synthesis gas (i.e. CO and $H_2$).

| Catalyst | Example in which catalyst preparation is described | Reaction temperature (°C.) | $CH_4$-conversion (%) | Selectivity for CO (%) | Selectivity for $H_2$ (%) | $H_2/CO$ mole ratio |
|---|---|---|---|---|---|---|
| $NiO$—$MgO$—$La_2O_3$ (Ni:Mg:La = 1:1:0.1) | Example-27 | 703 | 73.0 | 94.5 | 93.9 | 1.99 |
|  |  | 600 | 65.3 | 88.5 | 90.2 | 2.04 |
|  |  | 496 | 58.6 | 82.9 | 85.9 | 2.07 |
| $NiO$—$CaO$—$Sm_2O_3$ | Example-28 | 500 | 74.2 | 86.0 | 89.3 | 2.08 |

TABLE 3-continued

Performance of the catalysts, preparation of which is described in EXAMPLES 27, 28 and 3, in oxidative conversion of methane to synthesis gas (i.e. CO and $H_2$).

| Catalyst | Example in which catalyst preparation is described | Reaction temperature (°C.) | $CH_4$- conversion (%) | Selectivity for CO (%) | Selectivity for $H_2$ (%) | $H_2$/CO mole ratio |
|---|---|---|---|---|---|---|
| (Ni:Ca:Sm = 1:1:0.1) $NiO-MgO-Sm_2O_3$ | Example-3 | 702 | 81.7 | 95.0 | 96.6 | 2.03 |
| (Ni:Mg:Sm = 1:1:0.1) | | 602 | 76.8 | 92.0 | 93.1 | 2.02 |
| | | 507 | 69.1 | 86.7 | 89.7 | 2.07 |
| | | 326 | 61.9 | 79.2 | 87.0 | 2.20 |

EXAMPLE-30

Preparation of $NiO-Al_2O_3-La_2O_3$ catalyst (Ni:Al:La = 1:1:1).

Finely ground 4.10 g of $Al_2O_3$, 17.39 g of $La(NO_3)_3.6H_2O$, 11.68 g of $Ni(NO_3)_2.6H_2O$ and 4 ml of deionized water are thoroughly mixed and the resulting mixture is dried in air at 120° C. for 6 h. The dried mass is decomposed at 610° C. for 5 h. The decomposed mass is then powdered, pressed binder-free at 5 ton pressure and crushed to 22-30 mesh size particles. The catalyst particles are then calcined in air at 910° C. for 5 h to provide the $NiO-Al_2O_3-La_2O_3$ catalyst. The surface area of the catalyst was 12.08 $m^2.g^{-1}$.

EXAMPLE-31

Use of the catalysts, the preparation of which is described in EXAMPLES 30 & 4, for the oxidative conversion of methane to synthesis gas. The reaction over the catalysts was carried out in the reactor and by the procedure similar to that described in Example-2, at the following reaction conditions.

| Feed composition | 67 mol % $CH_4$ and 33 mol % $O_2$ |
|---|---|
| Gas hourly space velocity (GHSV) | 515,000 $cm^3 \cdot g^{-1} \cdot h^{-1}$ |
| Pressure | 1.35 atm. |

The results obtained using the catalysts at different reaction temperatures are presented in Table-4.

N is an element selected from Mg, Ca, or a mixture thereof; n is N/R mole ratio, wherein n is from 0 to 100, R is a rare earth element selected from La, Ce, Pr, Nd, Pm, Sm, Eu, Gd, Tb, Dy, Ho, Er, Tm, Yb, Lu or a mixture of two or more thereof; O is oxygen and p is number of oxygen atoms needed to fulfill the valence requirement of the elements in the composite catalyst, wherein said process comprises:

(i) mixing thoroughly one or more finely ground transition metal compounds represented by formula: $T.X_a$ wherein T is a transition element selected from Ni, Co, Ru, Rh, or a mixture of two or more thereof, X is selected from $NO_3$, $CH_3COO$, OH, O, $CO_3$, Cl or oxalate anions, and a is number of X required to fulfill the valence requirement of the transition element T, and one or more finely ground rare earth metal compound(s) represented by the formula: $R.Y_b$ wherein R is a rare earth element selected from La, Ce, Pr, Nd, Pm, Sm, Eu, Gd, Tb, Dy, Ho, Er, Tm, Yb, Lu or a mixture of two or more thereof, Y is selected from selected from $NO_3$, OH, O, $CO_3$, $CH_3COO$, Cl or oxalate anions, and b is number Y required to fulfill the valence requirement of the rare earth element and one or more finely ground non-transition metal compound(s) represented by formula: $N.Y_b$ wherein, N is selected from non-transition elements Mg, Ca, or a mixture thereof wherein the T/R mole ratio is 0.01 to 100 and the N/R mole ratio is 0 to 100, (ii) heating the mixture to dryness at a temperature of about 80° to 250° C. in air;

(iii) decomposing the dried mass containing catalyst precursors to their oxides at a temperature of about 400° to 1500° C. in presence of air, inert gas or under vacuum for about 0.1 to 50 hours;

TABLE 4

Performance of the catalysts, preparation of which is described in EXAMPLES-30 & 4, in oxidative conversion of methane to synthesis gas (i.e. CO and $H_2$).

| Catalyst | Example in which catalyst preparation is described | Reaction temperature (°C.) | $CH_4$- conversion (%) | Selectivity for CO (%) | Selectivity for $H_2$ (%) | $H_2$/CO mole ratio |
|---|---|---|---|---|---|---|
| $NiO-Al_2O_3-La_2O_3$ | Example-30 | 701 | 84.3 | 94.6 | 94.5 | 2.00 |
| (Ni:Al:La = 1:1:1) | | 604 | 77.7 | 89.6 | 92.6 | 2.07 |
| | | 496 | 72.3 | 87.1 | 90.3 | 2.07 |
| $NiO-Al_2O_3-Yb_2O_3$ | Example-4 | 702 | 89.5 | 95.9 | 94.9 | 1.98 |
| (Ni:Al:Yb = 1:1:1) | | 601 | 82.0 | 92.6 | 92.6 | 2.00 |
| | | 500 | 79.4 | 90.7 | 90.8 | 2.00 |
| | | 297 | 69.7 | 84.8 | 86.1 | 2.03 |

We claim:

1. A process for the preparation of composite catalysts comprising metal oxides, said catalysts used in the production of a gas comprising $H_2$ and CO by oxidative conversion of a gas comprising methane wherein said catalysts are represented by formula: $T_mN_nRO_p$ wherein T is a transition element selected from Ni, Co, Ru, Rh, or a mixture of two or more thereof; m is T/R mole ratio, wherein m is from about 0.01 to about 100;

(iv) powdering the decomposed mass and forming catalyst pellets, extrudes and granules; and (v) calcining the catalyst at a temperature of about 500° to 1000° C. in presence of air, inert gas, $CO_2$ or a mixture thereof, or under vacuum for about 0.1 to 100 hours.

2. A process according to claim 1, wherein m is from 0.1 to 10.

3. A process as according to claim 1, wherein n is from 0 to 10.

4. A process according to claim 1, wherein the period of catalyst calcination is from 0.5 to 20 hours.

5. A process according to claim 1, wherein the dried mass is decomposed for 0.5 to 20 hours.

* * * * *